March 18, 1969  B. VER NOOY  3,433,507
SPLIT T
Filed Feb. 24, 1966
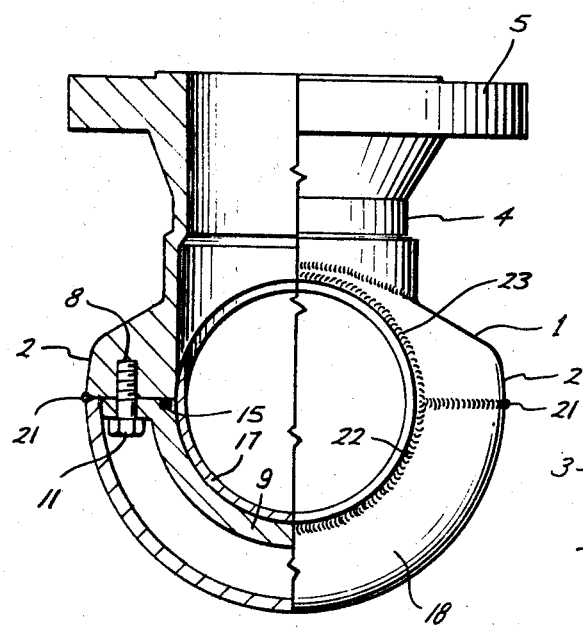
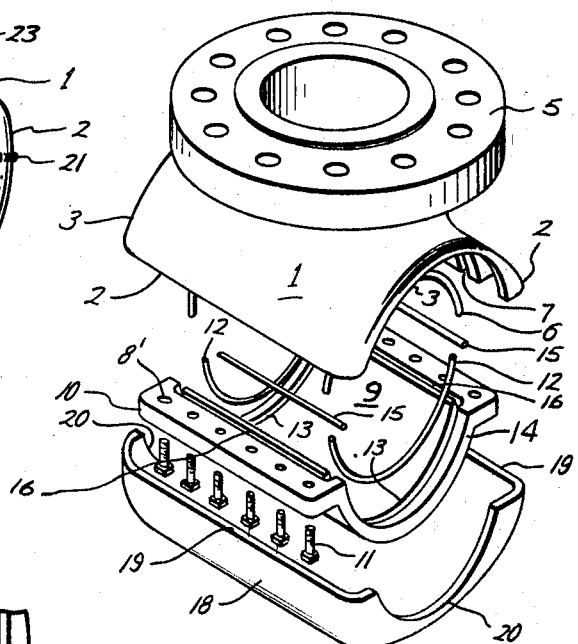
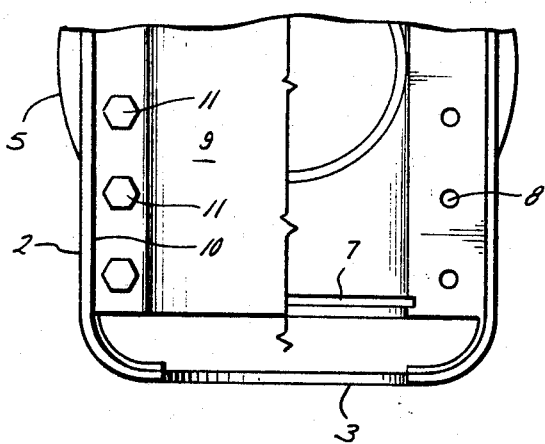
Burton Ver Nooy
INVENTOR.
BY
ATTORNEYS

United States Patent Office 3,433,507
Patented Mar. 18, 1969

3,433,507
SPLIT T
Burton Ver Nooy, Broken Arrow, Okla., assignor to T. D. Williamson, Inc., Tulsa, Okla.
Filed Feb. 24, 1966, Ser. No. 529,822
U.S. Cl. 285—197     2 Claims
Int. Cl. F16l 41/00, 5/00, 13/02, 47/02

ABSTRACT OF THE DISCLOSURE

A bolted on split T adapted to be mounted on a pipeline and including first and second run sections and a branch section extending from about an opening in the first run section to provide external connection. The run sections are bolted together along corresponding longitudinal edges by a plurality of bolts to form the T. Tapped holes for receiving each bolt extend into but not through the longitudinal edges of said first run section and corresponding bolt holes extend through the longitudinal edges of the second run section. The longitudinal edges of the first run section preferably extend beyond the longitudinal edges of the second run section, and a hood which completely encloses and seals the second run section and the bolt holes therein is welded to the longitudinal edges of the first run section. The hood and the ends of the first run section are welded to the pipeline to complete the seal.

---

This invention relates to a split T which can be initially bolted on a pipeline and which also can be later welded to the pipeline in a practical and economical manner.

Split T's are useful in many applications, particularly in the hot tapping of pipelines. Pipelines are hot tapped when lateral openings are cut in the pipeline while it is in service. This is usually done by attaching a split T to the pipeline, installing a valve on the T and mounting a hot tapping machine on the valve. The hot tapping machine is designed to extend a cutter through the valve to cut a coupon from the wall of the pipeline, after which the cutter carrying the coupon is retracted through the valve, the valve closed, the hot tapping machine removed, and the lateral connection completed.

In this way a line break can be isolated and by-passed, using two split T's, and service through a by-pass maintained, or a pipeline plugged off by tapping a hole of sufficient size. In any event, service need not be interrupted.

Usually split T's are provided in such cases by welding a permanent T, comprising two semi-circular run sections, to the pipeline. Conditions around the pipeline, such as leakage of combustible fluids from the pipeline, may make immediate welding operations hazardous so that they must be postponed until after the leak has been repaired and the area cleared of combustible matter. Also, it is desirable to restore pipeline service or stop leakage as fast as possible without relying on the arrival of welders and their equipment.

Thus, split T's which may be bolted in place at a desired location on a pipeline have been made available and provide a quickly and easily installed T for emergency tapping operations. It is often desirable, however, when conditions become favorable, is weld the bolted on split T to the pipeline. Heretofore, these bolted on split T's have been of a design such that extensive welding, which is costly and time consuming, has been required to sealingly weld them to the pipeline. Furthermore, even when permanently welded to a pipeline, these bolted on split T's maintain the appearance of a temporary T.

As an example, a split T has been offered which may be mounted on a pipeline by placing two semi-circular run sections on the pipeline and then passing bolts through laterally extending flanges on each of the two run sections and running a nut up on each end of the bolts. When a permanent connection is desired, and in order to provide a permanent seal, it is necessary to not only weld the ends of the run sections to the pipeline and to weld the flanges together, but also to weld the nuts to the bolts and to the flanges. In one embodiment of this T, which has fourteen bolts connecting the run sections together, fifty-six additional welding operations are necessary to seal the T connection to the pipeline. Even after this extensive welding operation, however, the T maintains the appearance of a temporary connection.

It is therefore an object of this invention to provide a split T which may be quickly, simply and economically secured to a pipeline by bolts to provide a temporary T connection and in which the bolting is so arranged that the T may also later be permanently secured to the pipeline by a minimum amount of welding while also providing an adequate permanent seal. The split T herein described also has the appearance of a permanent T connection after it is welded to a pipeline.

Other objects, advantages and features of this invention will become apparent to one skilled in the art upon reading the following description.

In the accompanying drawings illustrating a preferred embodiment of this invention and in which like numerals are employed to designate like parts throughout the same:

FIG. 1 is an exploded isometric view showing the arrangement of the component parts of a preferred embodiment of this invention;

FIG. 2 is an end view, partially in elevation and partially in vertical section, of the assembled split T of FIG. 1 mounted on a pipeline; and FIG. 3 is a partial view from the bottom of the split T, with the component 18 of FIG. 1 removed.

In accordance with this invention, as illustrated in the drawings, a split T is provided which can be bolted in place and which can also be permanently welded to a pipeline with a minimum of welding. The bolted on split T includes first and second run sections and the bolting is arranged so that a plurality of bolts pass through openings in the second run section into tapped holes which terminate or bottom out within the first run section so that fluid cannot pass out through the tapped holes in the first run section. When a permanent connection to the pipeline is desired, a hood is provided enclosing the second run section and the bolts so that fluid cannot pass from the openings in the second run to the exterior of the T even though the bolts themselves are not welded. The hood is welded to the first run section and the pipeline and the ends of the first run section are also welded to the pipeline.

Also, appropriate seals may be provided between the run sections and the pipeline to provide an initial seal before the permanent weld seal is made.

In FIG. 1, the preferred form of the split T includes a first run section 1, which generally is semi-circular in cross-section, having longitudinal edges 2 and ends 3. The run section is curved inwardly at its ends so that the ends will lie proximate to pipeline 17 when the run section is placed thereon. A branch 4 having flange 5 or other suitable connector is carried by run section 1 to surround an opening (not shown) therein. Seals 6 fit into the semi-circular grooves 7 on each side of the opening. These may be of the O-ring type made of rubber or other resilient material so that they seal between a pipeline and the run section 1 on each side of the opening in the run section when it is mounted on a pipeline. Also, as shown in FIG. 3, a plurality of tapped holes 8 are spaced along each longitudinal edge 2 of run section 1 and extend a sufficient depth into run section 1 to receive bolts of the same thread size and configuration. Each of the tapped holes 8 terminates or bottoms out within run section 1 and does not extend through it so that fluid cannot pass from the interior of the T through these holes to the exterior of the T. Although in the preferred embodiment shown there are six tapped holes along each longitudinal edge 2, any number of holes and corresponding bolts sufficient to fasten the split T on a pipeline may be used.

Referring again to FIG. 1, a second run section 9 is provided, which is also generally semi-circular in cross-section, so that when it is connected to run section 1, a split T is formed. The run section 9 also has longitudinal edges 10 each with a plurality of openings 8' equal in number to the tapped holes in run section 1. The openings 8' are adapted to receive bolts 11 which can be screwed into the tapped holes 8 to connect the run sections 1 and 9 together.

Seals 12, which fit into the grooves 13 near ends 14 of the run section 9, can also be provided. Seals 15, which fit into the grooves 16, can also be provided to seal between the run sections when they are connected together. These seals can be of the O-ring type and made of rubber or other resilient material to seal between run section 9 and a pipeline and between the run sections. As shown in FIG. 1 the grooves 16 converge at their ends into the grooves 13 so that the seals 12 and 15 can be of one piece construction. If the seals 12 and 15 are of separate construction, however, it is desirable when the run sections 1 and 9 are connected by running in and tightening the bolts 11, that the ends of the seals 6 and 12 contact the seals 15 to provide a complete seal around the periphery of a pipeline and between the longitudinal edges 2 and 10.

Also, it is preferred, although not necessary, that run section 1 be constructed so that at least a portion of the longitudinal edges 2 and the ends 3 extend laterally beyond the longitudinal edges 10 and the ends 14 of run section 9 as shown in FIGS. 2 and 3. The distance that edges 2 and ends 3 so extend is such that a hood 18 can be welded to the run section 1 to provide a relatively flush connection therebetween. The hood 18 is shaped so that when installed, it will completely enclose the second run section and the bolts 11 which connect the run sections together. Also, it is curved at its ends 20 so they lie proximate to the pipeline when the hood is installed. Thus by welding the hood to the pipeline by weld 22 along ends 20 and to the upper run section by weld 21 along edges 19 and by welding the first run section to the pipeline by weld 23 along ends 3, the entire T is permanently fixed to the pipeline and sealed against leakage.

Since the tapped holes 8 do not extend through the run section 1 to the exterior thereof, there is no necessity of welding individual nuts or bolts to the section to seal against fluid loss. Since bolts 11 and openings 8' are completely enclosed by hood 18, an adequate seal against fluid loss through these openings is provided. Thus, the necessity of individual welds around numerous nuts and bolts is eliminated and welding time and cost are greatly reduced.

This construction has the further advantage of completely sealing between the split T and the pipeline by permanent welds rather than relying on the bolts and resilient seals to provide for permanent attachment and sealing.

From the foregoing it will be seen this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

As many possible embodiments may be made of the invention without departing from the scope thereof; it is to be understood that all matter herein set forth or shown in the accompanying drawings is to be interpreted as illustrative and not in a limiting sense.

The invention having been described, what is claimed is:

1. The split T of claim 2 in which at least a portion of the longitudinal edges of said first run section extend laterally beyond the corresponding longitudinal edges of said second run section and in which said hood abuts said laterally extending portion and is continuously butt welded thereto.

2. A split T adapted to be muonted on and encircle a pipeline comprising; a run having first and second run sections; said first run section having a branch thereon and having continuous welds respectively welding its ends to said pipeline; a plurality of bolts bolting said run sections together along their longitudinal edges to form said T, said bolts passing through openings in said run section into tapped holes in said first run section, said tapped holes terminating within said first run section whereby fluid is prevented from passing from the interior of the T through said tapped holes to the exterior of the T by a wall of said first run section; and an imperforate hood, continuous welds welding said hood to said first run section along the longitudinal edges thereof and the ends of the hood being continuously welded to said pipeline to form a sealed enclosure about said second run section and said bolts whereby fluid passing through said openings is prevented from passing to the exterior of the T by said hood without having to weld said bolts to seal said openings.

FOREIGN PATENTS 222,059   6/1959   Australia.

CARL W. TOMLIN, *Primary Examiner.*

DAVE W. AROLA, *Assistant Examiner.*

U.S. Cl. X.R.

285—286.